United States Patent [19]

Hiller

[11] Patent Number: 4,568,619
[45] Date of Patent: Feb. 4, 1986

[54] NONMAGNETIC PARTICLES TO IMPROVE PROPERTIES OF MAGNETIC RECORDING COMPOSITIONS

[75] Inventor: Dale M. Hiller, Wilmington, Del.

[73] Assignee: E. I. Du Pont De Nemours and Company, Wilmington, Del.

[21] Appl. No.: 502,717

[22] Filed: Jun. 9, 1983

[51] Int. Cl.$^4$ .............................. G11B 5/62; G11B 5/78
[52] U.S. Cl. .................................. 428/694; 428/702; 428/900; 360/134
[58] Field of Search ............... 428/694, 900, 328, 329, 428/330, 702; 252/62.54; 360/134

[56] References Cited

U.S. PATENT DOCUMENTS

| | | | |
|---|---|---|---|
| 4,363,850 | 12/1982 | Yasai et al. ....................... | 252/62.54 |
| 4,364,998 | 12/1982 | Andoh et al. ..................... | 252/62.54 |
| 4,399,189 | 8/1983 | Nakashima et al. .............. | 252/62.54 |
| 4,405,481 | 9/1983 | Yamada et al. ................... | 252/62.54 |
| 4,414,270 | 11/1983 | Migoshi et al. ................... | 428/330 |
| 4,420,408 | 12/1983 | Kajimoto et al. ................. | 428/329 |
| 4,420,531 | 12/1983 | Tokuda .............................. | 428/329 |
| 4,420,532 | 12/1983 | Yamaguchi et al. .............. | 428/329 |
| 4,425,400 | 1/1984 | Yamaguchi et al. .............. | 428/329 |

*Primary Examiner*—George F. Lesmes
*Assistant Examiner*—William M. Atkinson

[57] ABSTRACT

Ferromagnetic recording elements with improved physical properties have from 20 to 50% of the volume of ferromagnetic particles replaced by nonmagnetic particles of a size smaller than the thickness of the magnetic layer.

2 Claims, No Drawings

NONMAGNETIC PARTICLES TO IMPROVE PROPERTIES OF MAGNETIC RECORDING COMPOSITIONS

BACKGROUND OF THE INVENTION

1. Field of Invention

This invention relates to ferromagnetic compositions useful for magnetic recording, and, in particular, to an improved magnetic recording element containing large amounts of nonmagnetic particles to improve physical properties.

2. State of the Art

In general, the magnetic layer of a magnetic recording medium is formed by applying a magnetic coating composition comprising magnetic particles, a binder and an organic solvent onto the surface of a base material such as a polyester film. Such magnetic layer is required to have a high durability since it runs slidingly in close contact with a magnetic head on recording and reproducing of the magnetic recording medium. Further, the magnetic particles in the magnetic layer are required to be uniformly dispersed so as to have a high sensitivity and a good S/N ratio.

The problems associated with friction and wear between magnetic recording elements and recording and playback heads have been frequently dealt with in previous inventions. The problems are particularly severe in computer and television applications where tapes and disks must move at high speeds and the head gaps are shallow. As a result, heads made from the most durable available materials have a short life and a high replacement cost.

One approach to improved head life has been to reduce the abrasiveness of the tape by the incorporation of particulate lubricants such as carbon black and the sulfides of tungsten and molybdenum, as described, for example, in U.S. Pat. Nos. 3,387,993, 3,423,233, 3,437,510, 3,476,596, British Pat. No. 868,346 and German Pat. No. 1,297,671. Another approach to maintaining signal stability is to make head wear more uniform by including in the tape very hard particles that are even more abrasive than the ferromagnetic particles, e.g., flint, garnet, and silicon carbide, as described, for example, in U.S. Pat. No. 3,630,910 and in German Pat. Nos. 1,804,393 and 1,953,459.

Several prior inventions teach the incorporation of various nonmagnetic particulates in magnetic recording elements in various amounts. U.S. Pat. No. 3,929,658 teaches the incorporation of metal oxides with a Moh hardness of 5.5 or less in amounts of 2 to 20% of the weight of the ferromagnetic material. U.S. Pat. No. 3,833,412 discloses the incorporation of abrasive materials with a Moh hardness above 6 and a size below 5 microns. U.S. Pat. No. 4,015,042 is directed to the incorporation of a bimodal distribution of (a) particles with a size of 0.3 to 2 microns in an amount of 0.005 to 0.025, and (b) particles with a size up to 0.1 micron in an amount of 0.02 to 0.06, both amounts being in parts by weight based on the weight of ferromagnetic particles.

In spite of all the prior art teachings, there is still a need for improvement in processing and mechanical properties (durability, adhesion, friction, signal retention, and still framing) of magnetic recording elements in high speed applications.

SUMMARY OF THE INVENTION

It has been discovered that ferromagnetic chromium dioxide can be diluted with nonmagnetic particles to a much greater extent than had been previously anticipated. The present invention provides an improved magnetic recording element, and particularly an improved video tape, in which from 20 to 50% of the volume of ferromagnetic particles are replaced by nonmagnetic particles of a size smaller than the thickness of the magnetic layer making up the element. This makes it possible to improve the physical properties of magnetic discs and tapes to provide superior runability, adhesion, friction and still framing properties, without sacrifice of signal quality, or with such slight loss of signal quality as to remain within minimum specifications. It is most surprising to find that the volume of ferromagnetic materials can be extended and diluted by 20–50% with auxiliary pigments of considerably lower cost while still maintaining good ferromagnetic properties and improved physical properties. For example, U.S. Pat. No. 4,363,850 discloses that when $Cr_2O_3$ particles are employed with more than 10% by wt. of $\alpha$-$Fe_2O_3$, based on the wt. of magnetic particles, the output of the magnetic particles is low.

Unlike the prior art teachings the nonmagnetic particles employed in the present invention may be present in an amount of 20–50% by volume of the total volume of all particles in the layer, and are not restricted in Moh hardness or particle size. The particles need only to be smaller than the thickness of the layer. Particles with Moh hardness from 1 to 7 are suitable, e.g., iron oxide and zinc oxide with a Moh hardness of 4–5, silica and chromium oxide with a Moh hardness of 6–7, and polymer beads with a Moh hardness of 1–3.

In particular, the present invention provides an improved magnetic recording element comprising a support, and a magnetic recording layer on said support, the recording layer comprising a binder having dispersed therein solid particles of (a) 50 to 70% ferromagnetic chromium dioxide, and (b) 30 to 50% of one or more of zinc oxide, alpha iron oxide, silica, mica or insoluble organic polymer beads, these percentages being by volume of the total volume of all solid particles. Zinc oxide and alpha iron oxide with a surface area below 30 $m^2/g$ are particularly effective.

DETAILED DESCRIPTION OF THE INVENTION

The magnetic recording element of the present invention may contain any of the particulate ferromagnetic particles known in the art, such as alpha iron oxide, cobalt-modified iron oxide, chromium dioxide, and various alloys, for example, those described in U.S. Pat. Nos. 3,535,104 and 3,567,525. A preferred material is acicular chromium dioxide having a tetragonal crystal structure of the rutile type, and a mean particle length not greater than 1.0 $\mu m$, with no more than 10 percent of the particles having a length greater than 1.0 $\mu m$. The chromium dioxide crystals may, if desired, include modifying elements, and the initial particles may have been treated to improve the level and stability of their magnetic characteristics. Suitable chromium dioxide materials are described in a number of patents, representative of which are U.S. Pat. Nos. 2,885,365, 2,923,683, 2,923,684, 2,923,685, 2,956,955, 3,034,988, 3,278,263, 3,512,930 and 3,529,930.

As the organic polymeric binder, there may be employed any of the commercially available polymers commonly used in preparing magnetic tapes and other magnetic recording members, including polymers prepared by addition polymerization or condensation polymerization from available monomers. Representative macromolecular, film-forming, organic polymer binding agents are polyurethanes, epoxides, vinyl polymers, polyacrylic or polymethacrylic acids or esters thereof, polybutadiene, polycarbonates, polyvinylidene chlorides, cellulose esters, and mixtures of the polymers or copolymers of two or more of the monomers of the foregoing polymers. Those skilled in the art can readily select from the large number of available polymers those that will give the desired combination of such properties as strength, elasticity, surface uniformity, and smoothness.

One preferred material is a soluble preformed polyester-polyurethane elastomer resin based on diphenylmethane diisocyanate, adipic acid, and an alkanediol having 2-4 carbon atoms. If desired, a binder of this kind may be hardened with such agents as polyfunctional isocyanates, e.g., 2,4-toluene diisocyanate/trimethylol propane (5/2), 4,4'-methylene-bis(cyclohexylisocyanate), and the like. Other preferred binders are the commercially available copolymers of vinylidene chloride with acrylonitrile, of butadiene with acrylonitrile, and of vinyl chloride with vinyl acetate. These may also be usefully combined with the polyester-polyurethane elastomer resins previously described. It is desirable that the binders have molecular weights greater than 20,000, and more preferably greater than 100,000.

The compositions may include conventional amounts of other conventional ingredients such as dispersing agents, antistatic agents, and lubricants.

In preparing magnetic recording compositions according to this invention, the procedures described below may be employed. In a typical procedure, the magnetic particles, the nonmagnetic particles, the dispersing agent and a quantity of solvent are placed in a container together with an amount of Ottawa sand equal to 4-6 times the combined weight of the magnetic and nonmagnetic particles. The container is closed and the ingredients are slurry-milled, for example, with the aid of a paint conditioner or shaker oscillating at about 700-1,000 cycles per minute. The milling may also be accomplished conveniently by the use of one or more stirring discs, e.g., two discs in tandem, rotating at peripheral speeds of 1,000-2,000 feet per minute. Conventional ball-milling and pebble-milling can also be used.

There is then added a solution of the polymeric binder component(s) in an amount sufficient to give the desired proportion of binder in the final dry composition. After further milling or shaking, there may be additions of such other components as lubricants, cross-linking agents, and the like, and it will frequently be desirable that the additions be made as solutions of these various ingredients. When sufficient final mixing and milling have been carried out, the dispersion may be filtered, deaerated, and adjusted to desired final viscosity by addition of solvent.

The dispersions prepared in this way may be cast by conventional techniques to form self-supporting films which may serve as integral magnetic recording members. Alternatively, they may be coated, by means of a doctor knife adjusted to give a coating of the desired thickness, on any suitable base material to form supported magnetic recording members. A particularly useful coating technique is the gravure-coating procedure described in Long, U.S. Pat. No. 3,468,700 and carried out with apparatus such as that described in Long, U.S. Pat. No. 3,392,701. Among the base materials that may be used are nonmagnetic metal sheets, plates, discs, drums, and the like, and previously prepared films, sheets, or tapes made from any of a number of organic polymeric materials having suitable characteristics of strength, dimensional stability, surface friction, and the like, all as well understood by those skilled in the art, e.g., films of cellulose acetate or polyethylene terephthalate.

In either case, i.e., supported or nonsupported, the films or coatings may be passed, while the coating is still fluid, between opposing magnets having an orienting field strength sufficient to align the magnetic particles in parallel fashion. The films or coatings containing the oriented magnetic particles are then allowed to dry at room or elevated temperature, and, when they contain cross-linking agents, to cure at temperatures and for periods of time sufficient to produce cross-linking of the polymers in the compositions.

Calendering of the dried film or coating is carried out by conventional means or conventional equipment. A typical calendering operation will involve passing the film or coating between a cotton-filled roll and a polished chrome-plated steel roll having its surface at a temperature of 65° C. to 105° C. at a pressure of 1,000-1,200 pounds per linear inch. When the magnetic recording member is in the form of a coating on a supporting film, the coated side of the film will be in contact with the polished steel roll.

The calendered film or coating may then be optionally submitted to further curing and/or a burnishing operation to improve further the smoothness of its surface. Suitable equipment and procedures for this purpose are well known in the art and are described, for example, in U.S. Pat. No. 2,688,567 and at pages 80-81 of Pear, "Magnetic Recording in Science and Industry," Reinhold Publishing Corporation, New York (1967).

In preparing compositions according to the present invention, the binder and auxiliary additions will preferably comprise from about 15-35% by weight of the dry composition, with 65 to 85 percent by weight of the composition comprising a combination of ferromagnetic particles and nonmagnetic particles. In comparison to the total volume which would be required to prepare a composition of only ferromagnetic particles in the binder and auxiliary additions, the replacement of ferromagnetic particles with from 20 to 50% by volume of nonmagnetic particles results in a particles-to-binder volume ratio which is the same for the present invention as for a magnetic recording element containing only ferromagnetic particles. A significant amount of the active ferromagnetic ingredient has been replaced by an inert diluent, yet the result is an element with not only good magnetic properties but improved mechanical properties as well.

The invention will be further explained by the following examples. The chromium dioxide used in these examples was prepared according to U.S. Pat. Nos. 3,278,263, 3,512,930 and 3,649,541 and was further made ready by mechanical milling to break up agglomerates and insure uniform fine particle size. All of the compositions of the examples employed, as either sole or major binder resin component, a polyesterpolyurethane resin based on diphenylmethane diisocyanate, adipic acid, an alkanediol of 2-4 carbon atoms or a mixture of such alkanediols, referred to hereafter for convenience as "polyurethane resin." All of the compositions also contained a polyfunctional isocyanate hardening agent, the reaction product of 5 moles of 2,4-toluene diisocyanate with 2 moles of trimethylolpropane, referred to hereafter for convenience as "isocyanate hardener." All compositions were prepared by sand-milling techniques like those previously described, with the use of tetrahydrofuran, cyclohexanone, and methyl isobutyl ketone as solvents. All were coated by conventional techniques on a polyethylene terephthalate film base and dried at temperatures of 30°-60° C. to remove solvent. After calendering and burnishing steps as described for each example, samples were slit to appropriate widths for the test described hereafter.

EXAMPLE 1

A. The following control composition was prepared by the previously described procedures in which chromium dioxide with a surface area of 30 m$^2$/g comprised 50% by volume and 81% by weight:

|  | Weight | Volume |
|---|---|---|
| Chromium dioxide | 3600 g | 742 ml |
| Bis(2-hydroxyethyl)octadecylamine | 68 g | 70 ml |
| Stearic acid | 54 g | 64 ml |
| Estane 5701 polyurethane resin: reaction product of butylene glycol adipate and methylene-bis(4-phenyl diisocyanate) and 1,4 butanediol, available from B.F. Goodrich, with a Brookfield viscosity of 300–800 cps 15% solids in THF and a Shore hardness of 88A | 610 g | 509 ml |
| Butyl stearate | 40 g | 47 ml |
| Zinc stearate | 10 g | 9 ml |
| Stearamide | 2 g | 2 ml |
| Isocyanate hardener: reaction product of 1 mole trimethylol propane and 3 moles tolyl 2,4 diisocyanate | 113 g | 96 ml |

B. A comparative composition was prepared in which all ingredients were the same as in control A above except that 37 ml (200 g) zinc oxide with a surface of 10 m$^2$/g was substituted for 37 ml (180 g) chromium dioxide. The resulting composition comprised 46% by volume chromium dioxide and 2.4% by volume zinc oxide, while on a weight basis zinc oxide constituted 4.5% and chromium dioxide 76.5%. Comparative Example B is thus within the 2 to 20% weight range of Beske in U.S. Pat. No. 3,929,658.

C. A composition was prepared in which 30% by volume of the chromium dioxide in control A was replaced with the zinc oxide used in comparison B.

D. A composition was prepared in which 50% by volume of the chromium dioxide in control A was replaced with an equal volume of the zinc oxide used in comparison B.

E. A composition was prepared in which 30% by volume of the chromium dioxide was replaced by nonmagnetic α–Fe$_2$O$_3$ pigment, available from Pfizer as R1599D.

Compositions A, B, C, D and E were each coated from a solvent comprising 2900 g tetrahydrofuran, 2100 g methyl isobutyl ketone, and 3524 g cyclohexanone onto a polyethylene terephthalate film base. Each composition was then dried at 50° C. to remove the solvent and stored at room temperature for 24 hours. The coatings were then calendered, slit into tapes, and burnished to provide uniform samples of 2.5 micron coated (18 microns total thickness) thickness for testing physical and magnetic properties. The video data was measured on JVC Vidstar Model HR 3300 and referenced to the JVC standard unrecorded tape. Table 1 gives comparative results.

| Sample | Coercivity Hc | Squareness Ratio φr/φs | Signal Loss After 102 Repetitions (dB) | Output (dB) Video 1.45 μ | 1.25 μ | S/N (dB) |
|---|---|---|---|---|---|---|
| A Control | 554 | 0.804 |  | 1.4 | 0.07 | 1.2 |
| B Comparison 5% ZnO | 557 | 0.869 | 4.3 | 1.3 | 1.0 | 0.4 |
| C 30% ZnO | 575 | 0.845 | 2.4 | 3.3 | 3.6 | 1.6 |
| D 50% ZnO | 555 | 0.806 | 0.5 | 1.2 | −0.5 | −0.3 |
| E 30% α-Fe$_2$O$_3$ | 562 | 0.827 | 2.5 | 1.9 | 1.5 |  |

When video information was recorded on these tapes and played back it was an unexpected result to observe that satisfactory image quality was maintained even when 50% of the ferromagnetic chromium dioxide had been replaced with nonmagnetic zinc oxide. As shown in Table 1, the control and the prior art comparison were equivalent in signal loss after being run for 102 repetitions in a video player, but samples of the present invention with high loadings of nonmagnetic oxides gave significantly low signal loss. Video tapes prepared according to the present invention exhibit low dropouts and satisfactory video quality.

EXAMPLE 2

Samples were prepared using the same binder formulation as in Example 1 which contained 5% and 30% α–Fe$_2$O$_3$ substituted on a volume basis for CrO$_2$. In headwear tests the 5% sample showed wear of 4.2μ after 100 hours running whereas the 30% sample showed 0.4μ. This illustrates the headwear advantage of the present invention over the prior art teaching of U.S. Pat. No. 3,929,658.

I claim:

1. An improved magnetic recording element comprising a support and a magnetic layer on said support, the recording layer containing a binder having dispersed therein solid particles of (a) 50 to 70% ferromagnetic chromium dioxide, and (b) 30 to 50% zinc oxide, these percentages being by volume of the total volume of all particles.

2. The magnetic recording element of claim 1 wherein said element is in the form of a tape.

* * * * *